US009358881B1

(12) United States Patent
Quijano

(10) Patent No.: US 9,358,881 B1
(45) Date of Patent: Jun. 7, 2016

(54) CONSOLE BRIDGE THAT ROTATES ABOUT AXIS FOR MULTIPLE INSTALLED POSITIONS AND IMPROVED ASSEMBLY CLEARANCE

(71) Applicant: Toyota Motor Engineering & Manufacturing North America, Inc., Erlanger, KY (US)

(72) Inventor: Jonathan Joseph Quijano, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/575,214

(22) Filed: Dec. 18, 2014

(51) Int. Cl.
   *B60R 7/04* (2006.01)
   *B60K 20/00* (2006.01)
   *B60K 20/04* (2006.01)

(52) U.S. Cl.
   CPC ............... *B60K 20/00* (2013.01); *B60K 20/04* (2013.01)

(58) Field of Classification Search
   CPC .......... B60R 7/04; B60R 7/06; B60R 2011/00
   USPC ............................. 296/37.8, 24.34; 180/336
   See application file for complete search history.

(56) References Cited

U.S. PATENT DOCUMENTS

| | | | |
|---|---|---|---|
| 4,818,008 A * | 4/1989 | Cressoni ................. | B60R 7/04 296/37.8 |
| 5,462,146 A * | 10/1995 | Doolittle ................ | B60K 20/04 192/218 |
| 5,887,485 A | 3/1999 | VanOrder et al. | |
| 6,267,217 B1 | 7/2001 | Malone et al. | |
| 6,428,072 B1 | 8/2002 | Moore | |
| 6,616,206 B2 | 9/2003 | Luginbill et al. | |
| 7,185,937 B2 | 3/2007 | Sakakibara | |
| 7,401,830 B2 | 7/2008 | Akimoto et al. | |
| 7,731,258 B2 | 6/2010 | Bazinski et al. | |
| 7,874,603 B2 | 1/2011 | Stoner | |
| 7,891,719 B2 | 2/2011 | Carnevali | |
| 8,215,688 B2 | 7/2012 | Hipshier et al. | |
| 8,701,819 B2 | 4/2014 | Porcs | |
| 8,708,387 B2 | 4/2014 | Yamaguchi et al. | |
| 2006/0113811 A1 | 6/2006 | Tanaka et al. | |
| 2013/0057010 A1 | 3/2013 | Vasko et al. | |

FOREIGN PATENT DOCUMENTS

KR          2002-0013093       *    2/2002

* cited by examiner

*Primary Examiner* — Dennis H Pedder
(74) *Attorney, Agent, or Firm* — Dinsmore & Shohl LLP

(57) ABSTRACT

The apparatus and method of the present disclosure enable a center console assembly of a vehicle to accommodate multiple transmission types with a single design, and further enable installation of the center console assembly without the need of a specially designed handle device separate from the center console assembly. The center console assembly includes a first side portion and a second side portion extending from a main body. A bridge member is pivotally coupled to the first side portion and the second side portion. The bridge member may be pivoted between a first position and a second position to accommodate a first transmission type or a second transmission type.

17 Claims, 5 Drawing Sheets

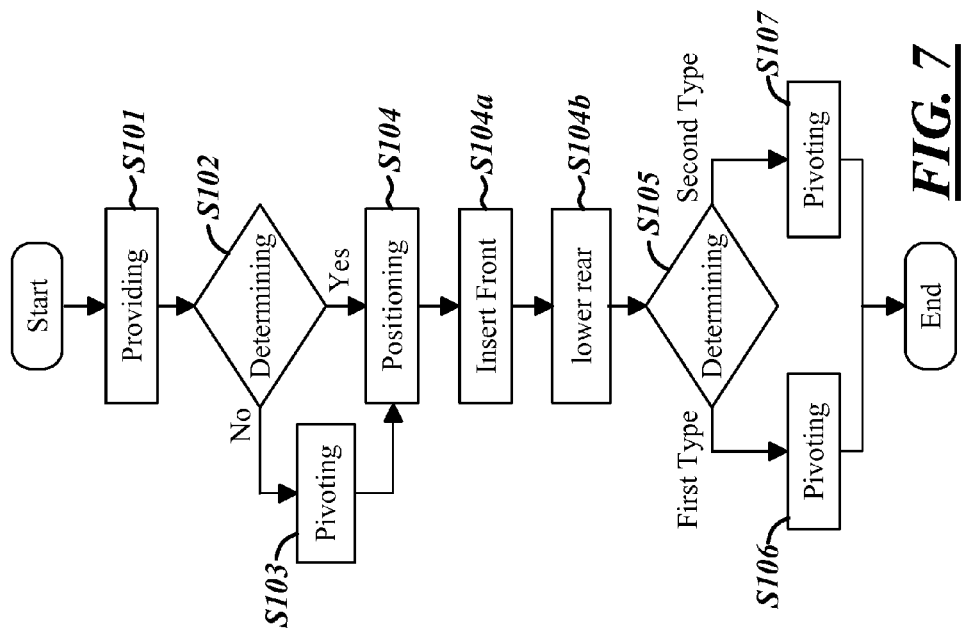
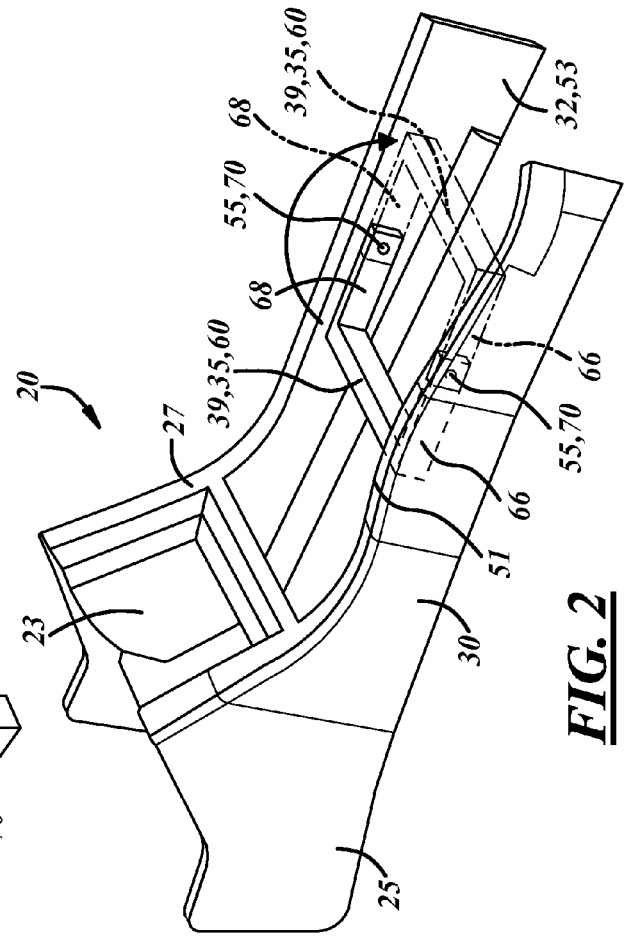

CONSOLE BRIDGE THAT ROTATES ABOUT AXIS FOR MULTIPLE INSTALLED POSITIONS AND IMPROVED ASSEMBLY CLEARANCE

FIELD OF THE INVENTION

The present disclosure relates to interior components of vehicles. Specifically, to a center console adapted to accommodate various vehicle transmission types with a single center console design.

DESCRIPTION OF THE RELATED ART

Vehicles have included center consoles for quite some time. Known center consoles typically begin near an instrument panel or dashboard of a vehicle, and extend towards a rear of the vehicle. The center console provides various features and utilities to the vehicle such as providing both a protective and aesthetically pleasing cover over mechanical components, such as the transmission of the vehicle. Center consoles are frequently supported by various internal frames and other structures. One example is U.S. Pat. No. 8,708,387 to Yamaguchi et al. which discloses a console box with a support structure spanning from one side of the box to another.

Known boxes still present opportunities for improvement. For example, different center consoles with different support structures may be required depending on the type of transmission installed in the vehicle. A vehicle with an automatic transmission may require a center console and support structure with one design, while a similar model vehicle with a manual transmission could require a separate and unique design. Additionally, because of the size and shape of the consoles, specialized tooling, such as a handle attachment, may be necessary to aid in manipulation of the console in the installation process.

Accordingly, based on the above described opportunities, a new and improved center console design is desired.

SUMMARY OF THE INVENTION

The present disclosure includes a center console assembly for a vehicle. The center console assembly accommodates multiple transmission types. The center console assembly includes a main body, a first side portion, a second side portion and a bridge member. The bridge member is disposed between the first side portion and the second side portion. The bridge member is pivotally coupled to the first side portion and the second side portion. The bridge member may be pivoted to a first position to accommodate a first type of transmission and also may be pivoted to a second position to accommodate a second type of transmission.

The present disclosure further includes a method for installing a center console assembly for a vehicle. The first step of the method is providing a center console assembly that has a pivotal bridge member capable of pivoting between an up position, a first position, and a second position. After the center console is provided, a determination is made as to whether the bridge member is in the up position. When the bridge is in a position other than the up position, the bridge member is pivoted in the up position. With the bridge member in the up position, the center console assembly is positioned into the vehicle in part by manipulation the center console assembly with the bridge member. Further, a determination is made as to if the vehicle has a first transmission type or a second transmission type. When it is determined that the vehicle has the first transmission type, the bridge member is pivoted to the first position. When it is determined that the vehicle has the second transmission type, the bridge member is pivoted to the second position.

Other features and advantages of the present invention will be readily appreciated, as the same becomes better understood after reading the subsequent description taken in conjunction with the accompanying drawings.

BRIEF DESCRIPTION OF THE DRAWINGS

FIG. 1 shows an illustration of a perspective view of a bridge member;

FIG. 2 shows an illustration of a perspective view of a center console assembly;

FIG. 7 shows an illustration of a flow chart of the step of install the center console assembly into a vehicle.

DETAILED DESCRIPTION OF THE EMBODIMENT

The apparatus and method of the present disclosure enables a center console assembly of a vehicle to accommodate multiple transmission types with a single design, and further enable installation of the center console assembly without the need of a specially designed handle device separate from the center console assembly. These advantages are provided by a pivoting support bridge member incorporated into the center console assembly. The bridge member pivots to an up position, where it functions as a handle to be used by an operator installing the center console. Further, the bridge member pivots to a first position to accommodate installation into a vehicle with one type of transmission, and also pivots to a second position to accommodate installation into a similar vehicle with a different type of transmission.

Figure 3:
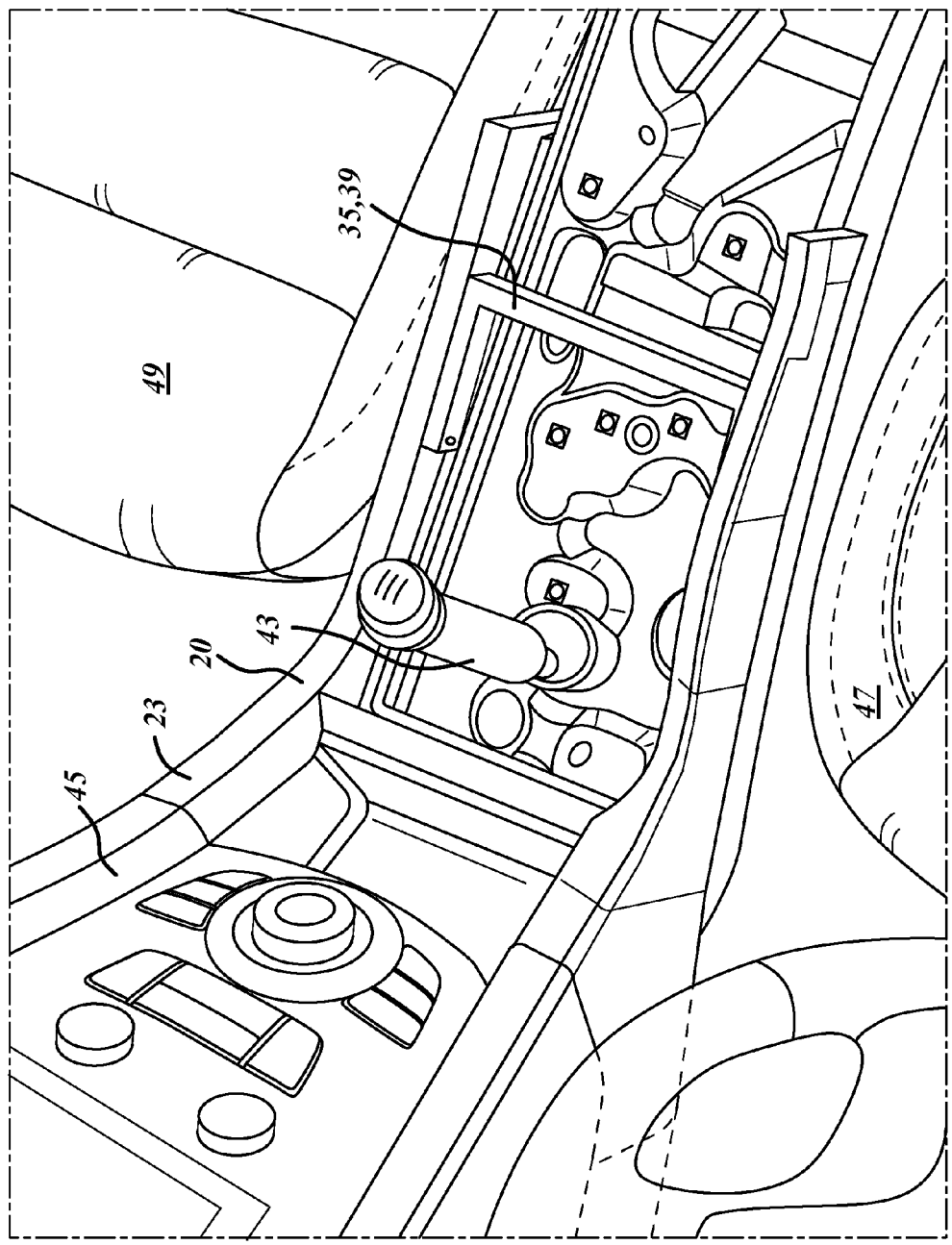
FIG. 3 shows an illustration of a perspective view of the center console assembly in a vehicle with a second type of transmission.
Figure 4:
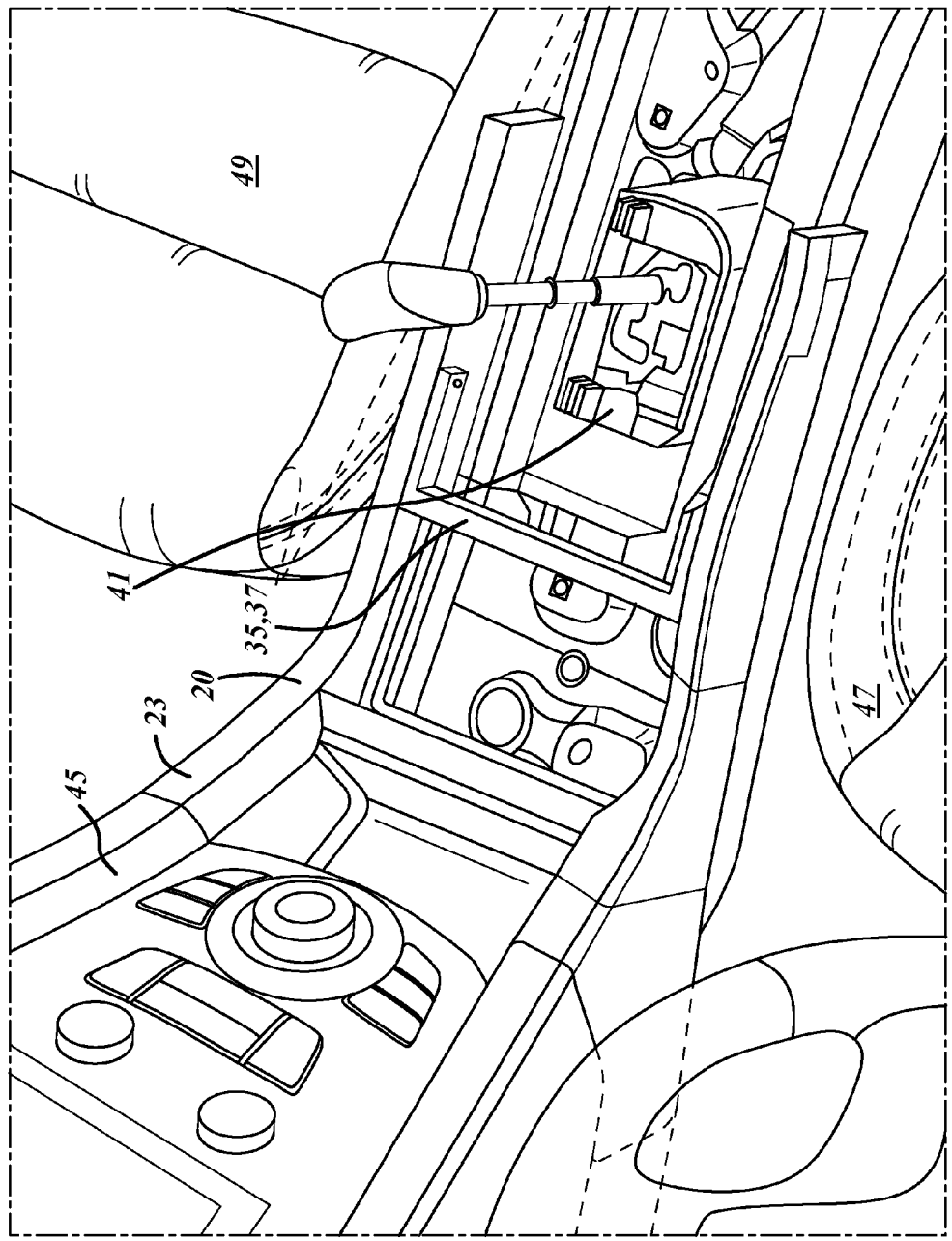
FIG. 4 shows an illustration of a perspective view of the center console assembly in a vehicle with a first type of transmission.
Figure 5:
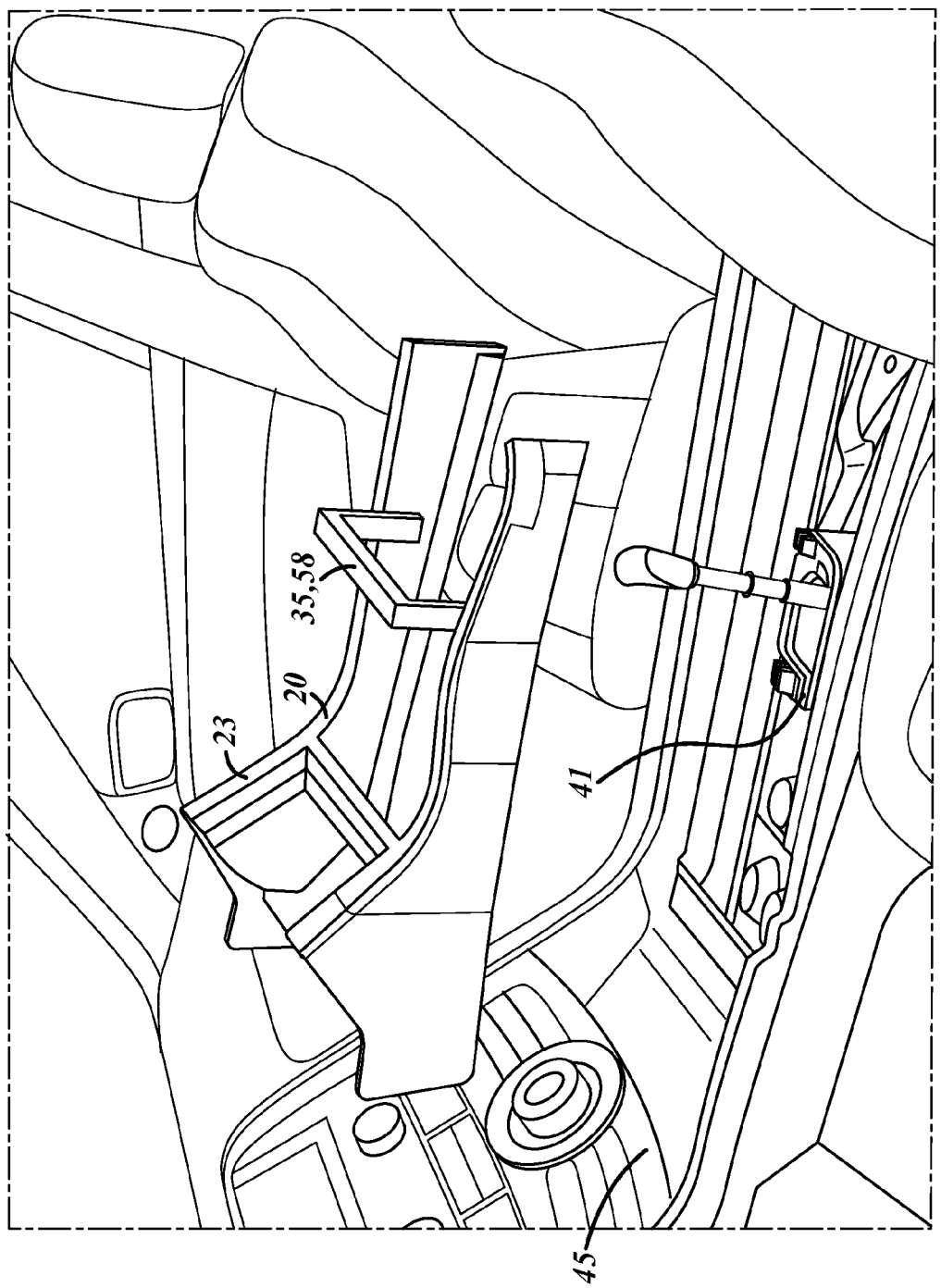
FIG. 5 shows an illustration of a perspective view of the center console assembly before it is installed in the vehicle with the bridge member in an up position.
Figure 6:
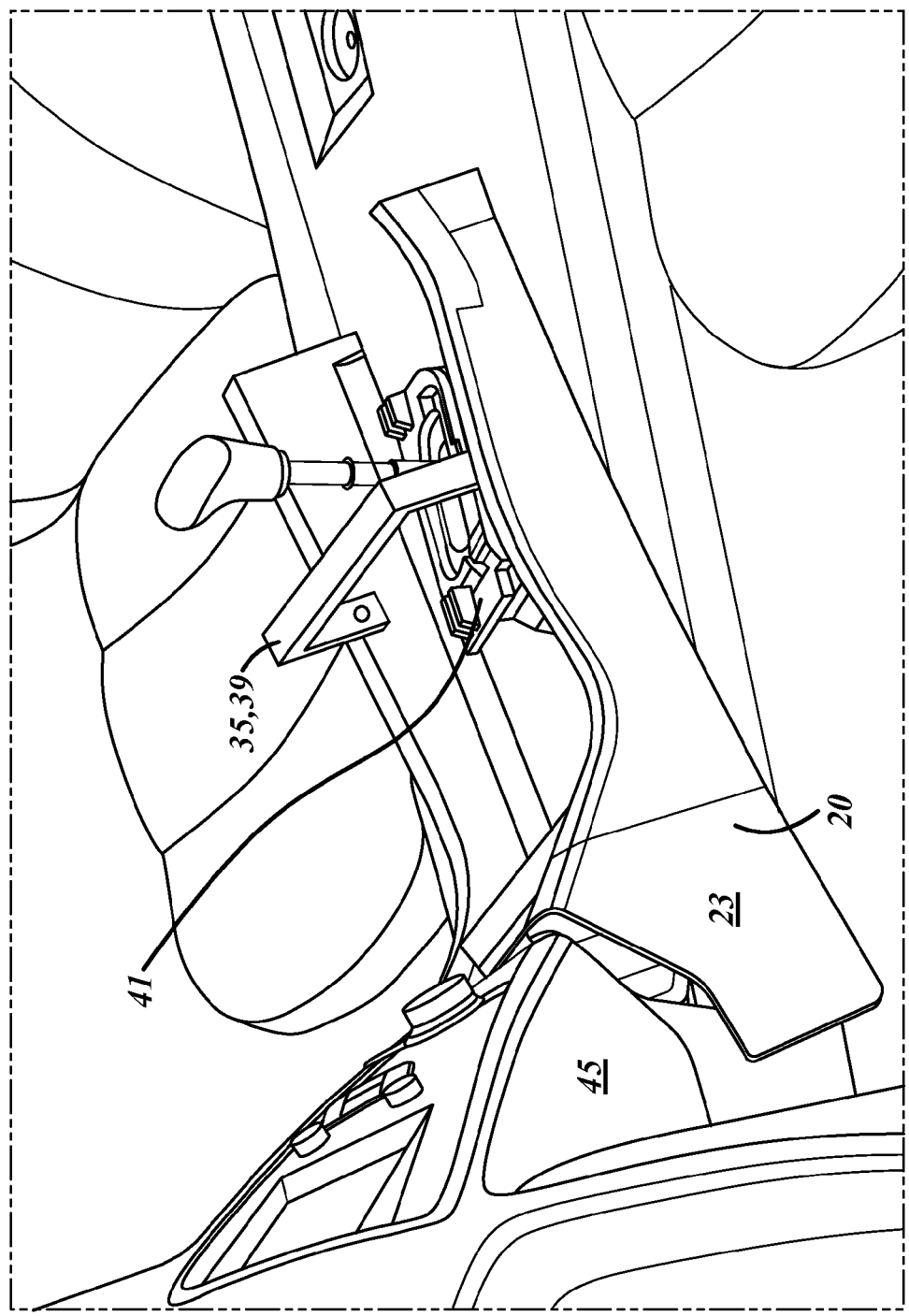
FIG. 6 shows an illustration of a perspective view of the center console assembly partially installed into the vehicle with the front portion of the center console assembly underneath an instrument panel of the vehicle.

The disclosed embodiment of a center console assembly 20 accommodating multiple transmission types is shown in FIGS. 1 through 6. The center console assembly 20 includes a main body 23 having a first side 25 and a second side 27. A first side portion 30 extends from the main body 23 at a location proximate the first side 25 of the main body 23. A second side portion 32 extends from the main body 23 at a location proximate the second side 27 of the main body 23. A bridge member 35 is disposed between the first side portion 30 and the second side portion 32. The bridge member 35 is pivotally coupled to the first side portion 30 and the second side portion 32. The bridge member may be pivoted between a first position 37 and a second position 39 to accommodate a first transmission type 41 or a second transmission type 43, respectively.

The main body 23 has a generally continuous structure between the first side 25 and the second side 27. The main body 23 is located towards a front of center console assembly 20, and typically extends underneath an instrument panel 45 of the vehicle in which the center console assembly 20 is installed. The main body 23 may have a hollow or shell type form, thereby allowing other vehicle components to be housed within the main body 23 for aesthetic or mechanical/functional reasons. The main body 23 may be made by lowing or injecting plastic into a mold, or by any other means known to those skilled in the art.

The first side 25 and second side 27 are located on opposite ends of the main body 23. The first side 25 and second side 27 are generally arranged laterally with respect to each other within the vehicle when the center console assembly 20 is installed. For example and illustration, the first side 25 in located on a driver side of the center console assembly 20, while the second side 27 is located on a passenger side of the center console assembly 20. The first side 25 and second side 27 may be generally vertical in nature, beginning near the instrument panel 45 and extending downward when the center console assembly 20 is installed in the vehicle.

The first side portion 30 and second side portion 32 extend from main body 23 at locations proximate their respective first side 25 and second side 27. For example and illustration, the first side portion 30 extends from the first side 25 on the driver side of the center console assembly 20 when the center console assembly 20 is installed in the vehicle, while the second side portion 32 extends from the second side 27 on the passenger side of the center console assembly 20 when the center consoles assembly is installed in the vehicle. When installed in the vehicle, the first side portion 30 and second side portion 32 generally extend from the main body in a rearward direction towards their relative driver seat 47 and passenger seat 49. The first side portion 30 and the second side portion 32 may be made of plastic, may be formed as an integral portion of the main body 23, may be fastened or otherwise secured to the main body 23, or may be formed by any other method known to those skilled in the art. It is understood and appreciated that the use of first and second with relation to the driver and passenger sides of the vehicle is merely a convention, and may be reversed or otherwise modified.

The first side portion 30 and the second side portion 32 include a first side interior surface 51 and a second side interior surface 53, respectively. The interior surfaces 51 53 run along the length of their respective side portions 30 32, and generally face the opposite side portion 32 30. For example, the interior surface 51 of the first side portion 30 generally faces the second side portion 32, conversely, the interior surface 53 of the second side portion 32 faces the first side portion 30. The interior surfaces 51 53 are minimally visible, if at all, when all vehicle components are installed.

A pin 55 is disposed on and extends from the interior surface 51 of the first side portion 30. A pin 55 is disposed on and extends from the interior surface 53 of the second side portion 32. The pins 55 are generally cylindrical in shape with an axis that is generally normal to the relative interior 51 53 in the area surrounding the pin 55. The pin 55 may be made of plastic and integrally formed with the relative side portion 30 32, may be a separate component that is secured to the interior surface 51 53 with glue, friction welding, etc., may be a separate component that is inserted into an aperture or receiving slot, may be made of metal, or may be made by any other suitable method or material known to those skilled in the art.

The bridge member 35 is disposed between the first side portion 30 and the second side portion 32. The bridge member 35 spans from the first side portion 30, to which it is pivotally coupled, to the second side portion 32, to which it is also pivotally coupled. The bridge member 35 provides support to the center console assembly 20 by connecting the first side portion 30 to the second side portion 32. The pivotal coupling of the bridge member 35 to the first side portion 30 and the second side portion 32 enables the bridge member to be pivoted between the first position 37, the second position 39, and an up position 58.

In the first position 37, the bridge member 35 is located towards the main body 23. Pivoting the bridge member 35 to the first position 37 provides more space in the area away from the main body 23 to accommodate the first transmission types 41, specifically those with control interfaces located towards the driver and passenger seats 47 49, and away from the main body 23. One such example of the first transmission type 41 is an automatic transmission.

In the second position 39, the bridge member 35 is located away from the main body 23. Pivoting the bridge member 35 to the second position 39 provides more space in the area towards the main body 23 to accommodate the second transmission types 43, specifically those with control interfaces located away from the drive and passenger seats 47 49, and towards the main body 23. One such example of the second transmission type 43 is a manual transmission.

In the up position 58, the bridge member 35 is located between the first position 37 and the second position 39. The up position 58 allows the bridge member 35 to function as a handle for an operator installing the center console assembly 20 into the vehicle, typically about half way between the first position 37 and the second position 39, although this may vary depending on the design of the center console assembly 20 and transmission types 41 43.

The bridge member 35 of the shown embodiment includes a middle portion 60. The middle portion 60 is generally linear with an extruded rectangle form. The middle portion 60 includes a first end 62 and an opposing second end 64. A first arm 66 extends from the first end 62 generally perpendicular to the middle portion 60. A second arm 68 extends from the second end 64 generally perpendicular to the middle portion 60. The first arm 66 and second arm 68 are generally linear with an extruded rectangle form. The first arm 66 and second arm 68 each include an aperture 70. The apertures 70 receive the pins 55 and enables pivotal coupling of the bridge member 35 to the side portions 30 32. The bridge member may be formed of injection molded plastic, machined or forged metal, or by any other suitable method and material known to those skilled in the art. The apertures 70 may merely be a receiving hole, or may incorporate a bushing or bearing to facilitate pivoting. It is understood and appreciated that alternately, pins may extend from the bridge member to be received in apertures in the side portions (not shown).

When the bridge member 35 is in the first position 37, or the second position 39, the first arm 66 lies flush against the interior surface 51 of the first side portion 30, and the second arm 68 lies flush against the interior surface 53 of the second side portion 32. A flush arrangement between the arms 66 68 and their respective side portions 30 32 maximizes the effective use of space within the vehicle by allowing the center console assembly to be as small as possible to house the component therein, with flush being defined as adjacent sides, surfaces or edges being close together. Flush arrangement provides no wasted space between the bridge member 35 and the side portions 30 32. Further, flush arrangement allows the bridge member 35 to provides support against flex of the side portions 30 32.

The bridge member 35 may provide additional support to the side portions 30 32 by be secured to the side portions 30 32 after installation. The bridge member 35 may be secured to the side portions 30 32 through the use of screws, fasteners, clips, an interference snap fit, or any other means known to those skilled in the art.

With reference now to FIG. 7, a flowchart illustrating a method for installing a center console assembly for a vehicle. The method begins with providing a center console assembly having a pivotal bridge member capable of pivoting between an up position, a first position, and a second position, step S101. The provided center console may be one as described above. It is then determined of the bridge member is in the up position, step S102. After the determination in S102, when it was determined that the bridge member was in a position other than the up position, the bridge member is pivoted into the up position, step S103. Next, the center console assembly is positioned onto the vehicle in part by manipulation of the center console assembly with the bridge member, step S104. An additional determination is made, namely whether the vehicle has a first transmission type or a second transmission type, step S105. When it is it determined that vehicle has the first transmission type, the bridge member is pivoted to the first position, step S106. When it is determined that the vehicle has the second transmission type, the bridge member is pivoted to the second position, step S107.

Determining if the bridge is in the up position, and pivoting the bridge member to the up position for steps S102 and S103 may be done by an operator. For example, the operator may visually inspect the provided center console assembly and manipulate the bridge member with their hands when necessary. Alternately, the determination and pivoting of S102 and 103 may be done by a machine, for example a system using a vision inspection system and robotic manipulation machine. Finally, the determination and positioning may be done ahead of time, for example by providing the center console assembly with the bridge member already in the up position.

Positioning the center console assembly onto the vehicle in part by manipulation of the bridge member, step S104, may be achieved by an operator or machine grasping the bridge member. When the center console is positioned, the front, or part of the main body, of the center console may be inserted underneath a portion instrument panel assembly of the vehicle, step S104a, and then a rear, or end opposite the main body, may be lowered down onto the vehicle, step S104b.

After the center console assembly has been positioned, step S104, and the type of transmission determined, step S105, the bridge member is pivoted by operator or machine to the proper first or second position, steps S106 and S107. The determination of the type of transmission, step S105, may be performed before or after the center console assembly has been poisoned onto the vehicle, step S104. The determination can be made by an operator, a machine, for example a vison system, or may be made ahead of time by installing the center console into a vehicle with a known transmission type.

The present invention has been described in an illustrative manner. It is to be understood that the terminology which has been used is intended to be in the nature of words of description rather than of limitation.

Many modifications and variations of the present invention are possible in light of the above teachings. Therefore, the present invention may be practiced other than as specifically described.

The invention claimed is:

1. A center console assembly for a vehicle, the center console assembly accommodating multiple transmission types, the center console assembly comprising:
   a main body having a first side portion and a second side portion; and
   a bridge member disposed between the first side portion and the second side portion, the bridge member pivotally coupled to the first side portion and the second side portion;
   wherein the bridge member is forwardly pivoted to a first position to accommodate a first type of transmission, and is rearwardly pivoted to a second position to accommodate a second type of transmission.

2. The center console assembly of claim 1 wherein the first position is forward towards the main body and the second position is rearward away from the main body.

3. The center console assembly of claim 2 wherein the first type of transmission is an automatic transmission.

4. The center console assembly of claim 2 wherein the second type of transmission is a manual transmission.

5. The center console assembly of claim 1 wherein the bridge member includes a middle portion with a first end opposite a second end, a first arm extending from the first end of the middle portion and a second arm extending from the second end of the middle portion.

6. The center console assembly of claim 5 wherein the middle portion, the first arm and the second arm are generally linear.

7. The center console assembly of claim 6 wherein the first arm extends generally perpendicularly from the middle portion, and the second arm extends generally perpendicularly from the middle portion.

8. The center console assembly of claim 5 further comprising:
   the first arm including an aperture;
   the first side portion including a pin disposed on an interior surface of the first side portion; and
   the pin of the first side portion received by the aperture of the first arm.

9. The center console assembly of claim 8 further comprising:
   the second arm including an aperture;
   the second side portion including a pin disposed on an interior surface of the second side portion; and
   the pin of the second side portion received by the aperture of the second arm.

10. The center console assembly of claim 9 wherein the pin of the first side portion is integrally formed as part of the first side portion, and the pin of the second side portion is integrally formed as part of the second side portion.

11. The center console assembly of claim 5 wherein the first arm is flush against the first side portion and the second arm is flush against the second side portion when the bridge member is in the first position.

12. The center console assembly of claim 5 wherein the first arm is flush against the first side portion and the second arm is flush against the second side portion when the bridge member is in the second position.

13. The center console assembly of claim 5 wherein the first arm and the second arm are generally linear.

14. The center console assembly of claim 13 wherein the first arm is flush against the first side portion and the second arm is flush against the second side portion when the bridge member is in the first position.

15. The center console assembly of claim 13 wherein the first arm is flush against the first side portion and the second arm is flush against the second side portion when the bridge member is in the second position.

16. A method for installing a center console assembly for a vehicle the method comprising steps of:

providing a center console assembly having a bridge member, the bridge member pivotal between an up position, a first position, and a second position;
determining if the bridge member is in the up position;
pivoting the bridge member into the up position when the bridge member is in a position other than the up position;
positioning the center console assembly onto the vehicle in part by manipulation of the center console assembly with the bridge member;
determining if the vehicle has a first type of transmission or a second type of transmission;
forwardly pivoting the bridge member to the first position when the vehicle has the first type of transmission; and
rearwardly pivoting the bridge member to the second position when the vehicle has the second type of transmission.

17. The method of claim 16 wherein positioning the center console assembly onto the vehicle include first inserting a front of the center console assembly underneath a portion of an instrument panel assembly of the vehicle, and then lowering a rear of the center console assembly down onto the vehicle.

\* \* \* \* \*